United States Patent [19]
Rentschler et al.

[11] Patent Number: 5,821,950
[45] Date of Patent: Oct. 13, 1998

[54] COMPUTER GRAPHICS SYSTEM UTILIZING PARALLEL PROCESSING FOR ENHANCED PERFORMANCE

[75] Inventors: Eric M. Rentschler; Monish S. Shah; Mary A. Matthews; Alan S. Krech, Jr.; Erin A. Handgen, all of Fort Collins, Colo.

[73] Assignee: Hewlett-Packard Company, Palo Alto, Calif.

[21] Appl. No.: 634,458

[22] Filed: Apr. 18, 1996

[51] Int. Cl.⁶ .................................................. G06F 15/80
[52] U.S. Cl. ........................ 345/505; 345/503; 345/522
[58] Field of Search ........................... 395/118–139, 501, 395/502, 503, 505, 511, 522

[56] References Cited

U.S. PATENT DOCUMENTS

| | | | |
|---|---|---|---|
| 5,408,606 | 4/1995 | Eckart | 395/502 |
| 5,440,682 | 8/1995 | Deering | 395/503 |
| 5,457,779 | 10/1995 | Harrell | 395/502 |
| 5,485,559 | 1/1996 | Sakaibara et al. | 395/133 |

*Primary Examiner*—Raymond J. Bayerl
*Assistant Examiner*—U. Chauhan

[57] ABSTRACT

A computer graphics system includes a plurality of geometry accelerators for processing vertex data representative of graphics primitives and providing rendering data. The system includes a distributor responsive to a stream of vertex data for distributing to the geometry accelerators chunks of the vertex data for processing by the geometry accelerators to provide chunks of rendering data. The distributor generates an end of chunk bit indicative of the end of each of the chunks of vertex data. The system further includes a concentrator for receiving the chunks of rendering data from each of the geometry accelerators and for combining the chunks of rendering data into a stream of rendering data in response to end of chunk bits. The stream of rendering data and the stream of vertex data represent sequences of graphics primitives having the same order. A rasterizer generates pixel data representative of a graphics display in response to the stream of rendering data.

14 Claims, 6 Drawing Sheets

COMPUTER GRAPHICS SYSTEM UTILIZING PARALLEL PROCESSING FOR ENHANCED PERFORMANCE

FIELD OF THE INVENTION

This invention relates to computer graphics systems and, more particularly, to a computer graphics system which utilizes parallel processing of vertex data to achieve enhanced performance.

BACKGROUND OF THE INVENTION

Computer graphics systems are commonly used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render, or draw, the graphics primitives that represent a view of one or more objects being represented on the display screen.

Typically, the primitives of the three-dimensional object to be rendered are defined by a host computer in terms of primitive data. For example, when the primitive is a triangle, the host computer may define the primitive in terms of the X, Y and Z coordinates of its vertices, as well as the red, green and blue (R, G and B) color values of each vertex. Additional primitive data may be used in specific applications. Rendering hardware interpolates the primitive data to compute the display screen pixels that represent each primitive, and the R, G and B color values for each pixel.

The basic components of a computer graphics system may include a geometry engine, or geometry accelerator, a rasterizer and a frame buffer. The system may also include texture mapping hardware. The geometry accelerator receives from the host computer vertex data which defines the primitives that make up the view to be displayed. The geometry accelerator performs transformations on the vertex data, decomposes quadrilaterals into triangles and performs lighting, clipping and plane equation calculations for each primitive. The output of the geometry accelerator is rendering data used by the rasterizer and the texture mapping hardware to generate final screen coordinate and color data for each pixel in each primitive. The pixel data from the rasterizer and the pixel data from the texture mapping hardware, if available, are combined and stored in the frame buffer for display on the video display screen.

The operations of the geometry accelerator are highly computation intensive. One frame of a 3-D graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. The data for a single quadrilateral may be on the order of 64 words of 32 bits each. Additional data transmitted from the host computer to the geometry accelerator includes lighting parameters, clipping parameters and any other parameters needed to generate the graphics display.

Various techniques have been employed to improve the performance of geometry accelerators, including pipelining and parallel processing. In order to successfully implement parallel processing of vertex data, certain requirements must be met. The vertex data processed in parallel by different geometry accelerators must be combined into a single stream of rendering data to be supplied to the rasterizer. The combining of rendering data may be difficult because different geometry accelerators complete processing at different times, depending on the amount and content of the vertex data. Furthermore, all or parts of some primitives may be clipped, or removed, from the data stream because those primitives fall outside the display screen. Thus, the rendering data output by the geometry accelerator may not have a one-to-one correspondence to the vertex data input to the geometry accelerator. Accordingly, it is desirable to provide a computer graphics system capable of efficient parallel processing of vertex data. The order of the primitives must not be changed in the parallel processing hardware.

SUMMARY OF THE INVENTION

In accordance with the invention, the methods and apparatus are provided for parallel processing of vertex data in a computer graphics system. A computer graphics system in accordance with the invention comprises a plurality of geometry accelerators for processing vertex data representative of graphics primitives and providing rendering data. The system further comprises a distributor responsive to a stream of vertex data for distributing to the geometry accelerators chunks of the vertex data for processing by the geometry accelerators to provide chunks of rendering data. The distributor generates an end of chunk bit indicative of the end of each of the chunks of vertex data. The system further comprises a concentrator for receiving the chunks of rendering data from of each of the geometry accelerators and responsive to the end of chunk bits for combining the chunks of rendering data from each of the geometry accelerators into a single stream of rendering data. The stream of rendering data and the stream of vertex data represent sequences of graphics primitives having the same order. The system further comprises a rasterizer responsive to the stream of rendering data for generating pixel data representative of a graphics display.

The distributor preferably includes a configuration register for defining the number of geometry accelerators in the system. A sequence for distributing chunks of vertex data to the geometry accelerators is a function of the number of geometry accelerators. The distributor further includes means for distributing the chunks of vertex data to the plurality of geometry accelerators in the defined sequence.

Preferably, the concentrator comprises a plurality of first-in first-out (FIFO) buffers respectively connected to the outputs of the geometry accelerators and a multiplexer having inputs respectively connected to the outputs of the FIFO buffers and an output for providing the stream of rendering data. The concentrator further comprises a multiplexer controller responsive to the end of chunk bits for sequentially selecting outputs of the FIFO buffers in the defined sequence.

In a first embodiment, the system includes first, second and third geometry accelerators. Chunks of vertex data are coupled from the distributor to the first and second geometry accelerators on a first distributor bus; chunks of vertex data are coupled from the distributor to the third geometry accelerator on a second distributor bus; chunks of rendering data are coupled from the first and second geometry accelerators to the concentrator on a first concentrator bus; and chunks of rendering data are coupled from the third geometry accelerator to the concentrator on a second concentrator bus.

In a second embodiment, the system includes first, second, third and fourth geometry accelerators. Chunks of vertex data are coupled from the distributor to the first and second geometry accelerators on a first distributor bus; chunks of vertex data are coupled from the distributor to the third and fourth geometry accelerators on a second distributor bus; chunks of rendering data are coupled from the first and second geometry to the concentrator on a first concentrator bus; and chunks of rendering data are coupled from the third and fourth geometry accelerators to the concentrator on a second concentrator bus.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
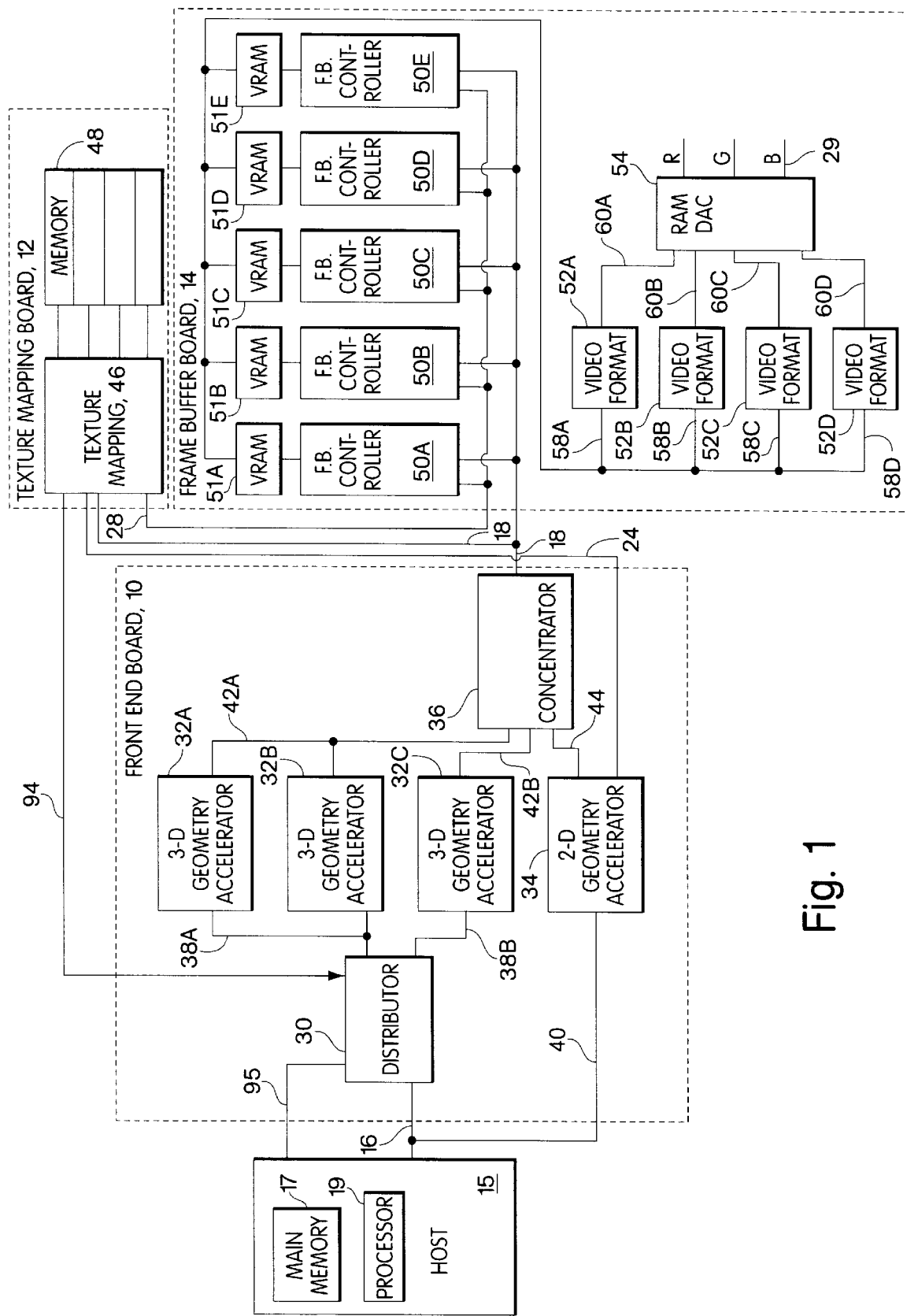
FIG. 1 is a block diagram of a first embodiment of a computer graphics system incorporating the present invention.

FIG. 1 is a block diagram of a first embodiment of a computer graphics system suitable for incorporation of the present invention. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12 and a frame buffer board 14. The front end board communicates with a host computer 15 over a host bus 16. The front end board receives primitives to be rendered from the host computer over bus 16. The primitives are specified by X,Y,Z coordinate data, R, G and B color data, alpha, normals and texture S,T coordinates for portions of the primitives, such as for the vertices when the primitive is a triangle.

Data representing the primitives in three dimensions then is provided by the front end board 10 to the texture mapping board 12, which is optional, and to the frame buffer board 14 over 64-bit bus 18. The texture mapping board interpolates the primitive data received to compute the screen display pixels that will represent the primitive, and determines corresponding resultant texture data for each primitive pixel. The resultant texture data is provided to the frame buffer board over five 11-bit buses 28, which are shown in FIG. 1 as a single bus for clarity of illustration.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is preferably pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 may include a distributor 30, three-dimensional (3-D) geometry accelerators 32A, 32B and 32C, a two-dimensional (2-D) geometry accelerator 34 and a concentrator 36. The distributor 30 receives the X,Y,Z coordinate and color primitive data over bus 16 from the host computer, and distributes 3-D primitive data evenly among the 3-D geometry accelerators 32A, 32B and 32C. In this manner, the system bandwidth is increased because three groups of primitives are operated upon simultaneously. Data is provided over 40-bit bus 38A to the 3-D geometry accelerators 32A and 32B, and over 40-bit bus 38B to 3-D geometry accelerator 32C. Each of the buses 38A and 38B transfers data at a rate of 60 MHz and provides sufficient bandwidth to support two 3-D geometry accelerators. 2-D primitive data is provided over a 44-bit bus 40 to the 2-D geometry accelerator 34 at a rate of 40 MHz.

Each 3-D geometry accelerator transforms the X,Y,Z coordinates that define the primitives received into corresponding screen space coordinates, determines object R,G,B values and texture S,T values for the screen space coordinates, decomposes quadrilaterals into triangles, calculates partial slope information, performs lighting calculations and computes a triangle plane equation to define each triangle. Each 3-D geometry accelerator also performs view clipping operations to ensure an accurate screen display of the resulting image when multiple windows within the screen are displayed, or when a portion of a primitive extends beyond the view volume represented on the display screen. Relevant operations performed by each 3-D geometry accelerator are described in more detail below. Output data from the 3-D geometry accelerators 32A, 32B and 32C respectively is provided over 44-bit buses 42A and 42B to concentrator 36 at a rate of 60 MHz. Two-dimensional geometry accelerator 34 also provides output data to concentrator 36 over a 46-bit bus 44 at a rate of 45 MHz. Concentrator 36 combines the 3-D primitive output data received from the 3-D geometry accelerators 32A–32C, reorders the primitives to the original order they had prior to distribution by the distributor 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the cache memory is formed from a plurality of SDRAM (synchronous dynamic random access memory) chips. The cache memory 48 stores texture MIP map data associated with the primitives being rendered in the frame buffer board. The texture MIP map data is downloaded from a main memory 17 of the host computer 15, over bus 40, through the 2-D geometry accelerator 34, and over 24-bit bus 24.

The texture mapping chip 46 successively receives primitive data over bus 18 representing the primitives to be rendered on the display screen. As discussed above, the primitives provided from the 3-D geometry accelerators 32A–32C include lines and triangles. The texture mapping board does not perform texture mapping of points or lines, and operates only upon triangle primitives. The data representing the triangle primitives includes the X,Y,Z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the X,Y pixel coordinates to calculate S and T coordinates that correspond to each X,Y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A, 50B, 50C, 50D and 50E are respectively coupled to groups of associated VRAM (video random access memory) chips 51A–51E. The frame buffer board may further include four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen. A blending mode defining the manner in which the object and texture color values are combined is controlled by a rendering mode control word that is provided over bus 28.

The resulting image video data generated by the frame buffer controller chips 50A–50E, including R,G,B values for each pixel, is stored in the corresponding VRAM chips 51A–51E. Each group of VRAM chips 51A–51E includes eight VRAM chips, such that forty VRAM chips are located on the frame buffer board. Each of video format chips 52A–52D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHz. The video format chips format the video data so that it can be handled by the RAMDAC and provide the formatted data over 32-bit buses 60A, 60B, 60C and 60D to RAMDAC 54 at a rate of 33 MHz. RAMDAC 54, in turn, converts the digital color data to analog R,G,B color control signals and provides the R,G,B control signals for each pixel to a screen display (not shown) along R,G,B control lines 29.

Figure 2:
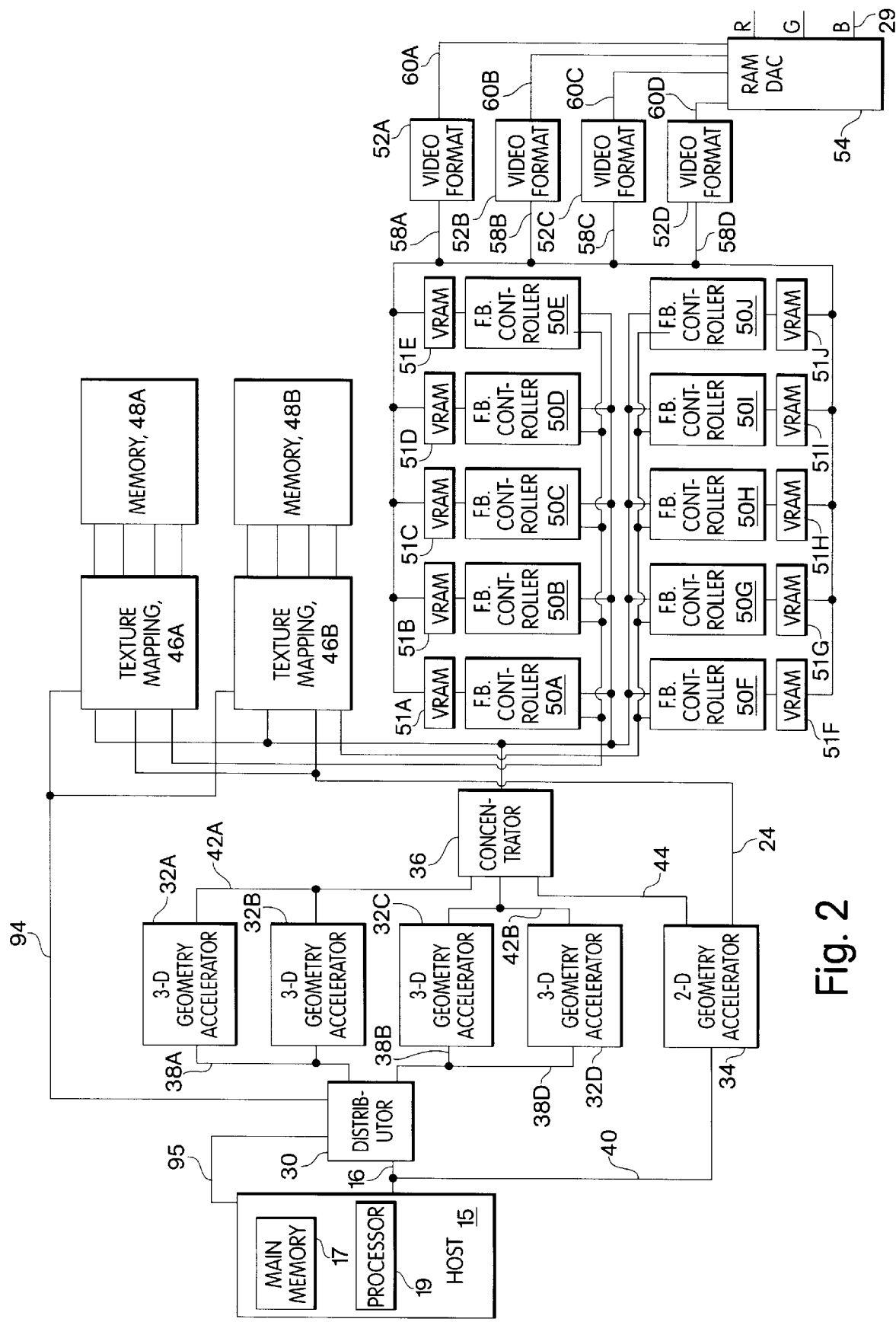
FIG. 2 is a block diagram of a second embodiment of a computer graphics system incorporating the present invention.

In one embodiment, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 2, which is a block diagram of a computer graphics system of the present invention having certain hardware replicated. The system of FIG. 2 includes four 3-D geometry accelerators 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 2 is similar to that of the system of FIG. 1, described above. The replication of the hardware in the embodiment of FIG. 2 allows for increased system bandwidth because certain primitive rendering operations can be performed in parallel on multiple primitives.

Figure 3:
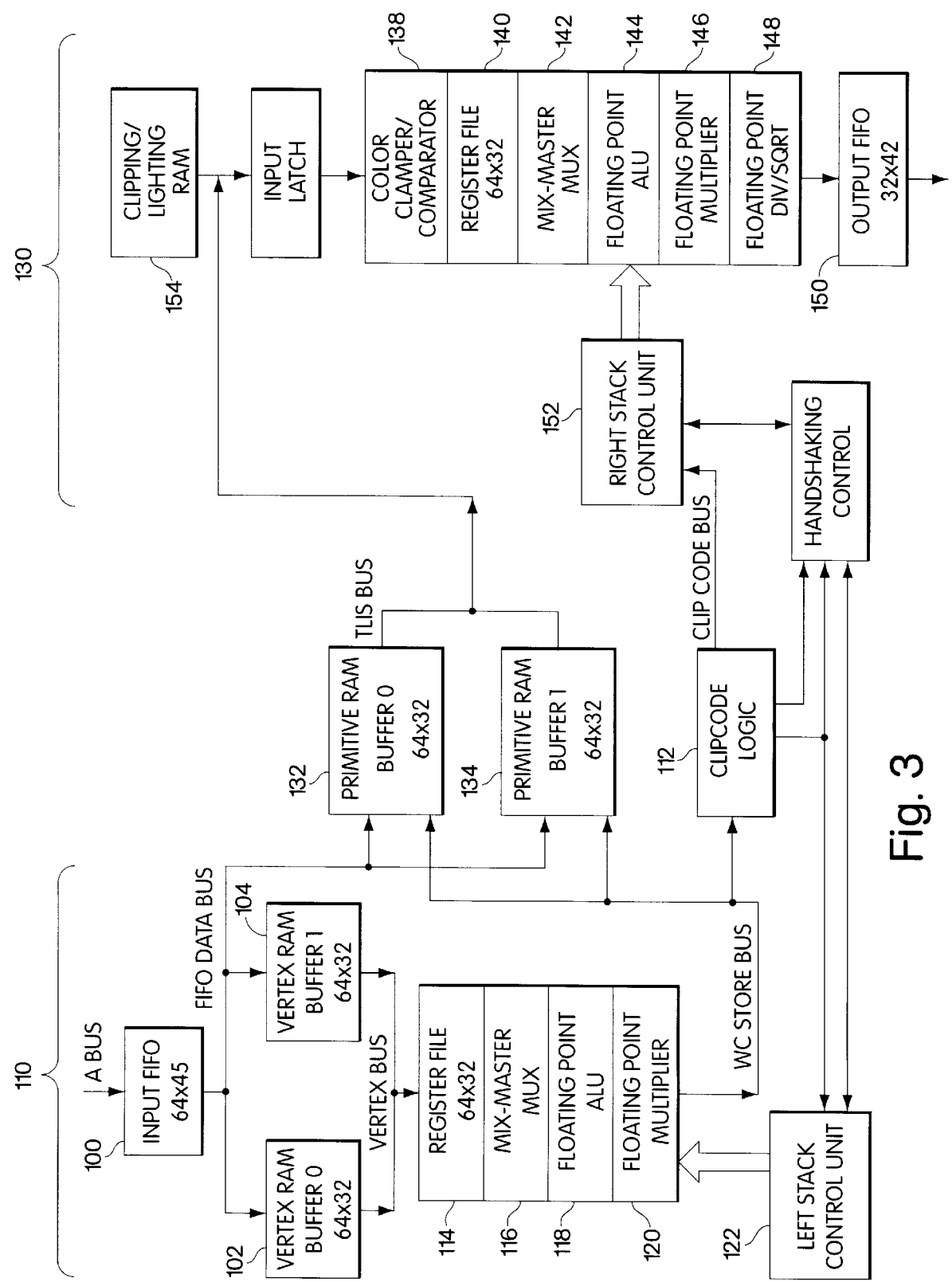
FIG. 3 is a block diagram of an embodiment of the geometry accelerators shown in FIGS. 1 and 2.

A simplified block diagram representative of geometry accelerators 32A, 32B and 32C and 32D is shown in FIG. 3. Primitive data from host computer 15 is supplied through an input FIFO 100 to a double-buffered vertex RAM which includes vertex RAM (buffer 0) 102 and vertex RAM (buffer 1) 104. The geometry accelerator includes two separate processors in a pipeline configuration. A left stack 110 includes clip code logic 112, a register file 114, a multiplexer 116, a floating point ALU 118 and a floating point multiplier 120. Operations of the left stack 110 are controlled by a left stack control unit 122, which includes address decode logic, a transformation engine and a decomposition engine. Results from the left stack 110 are supplied to a right stack 130 through a double-buffered primitive RAM, including a primitive RAM (buffer 0) 132 and a primitive RAM (buffer 1) 134. The right stack includes a color clamper/comparator 138, a register file 140, a multiplexer 142, a floating point ALU 144, a floating point multiplier 146, and a floating point divide/square root unit 148. Results from the right stack 130 are supplied through an output FIFO 150 to the texture mapping board 12 and to the frame buffer board 14 (FIG. 1). Operations of the right stack 130 are controlled by a right stack control unit 152, which includes lighting, clipping and plane equation engines. Clipping and lighting parameters are supplied by the host computer 15 to a clipping/lighting RAM 154. A handshaking control unit 156 is coupled between the left stack control unit 122, the right stack control unit 152 and the clip code logic 112. The handshaking control unit 156 controls communication between the left stack 110 and the right stack 130, and facilitates the two stacks working together.

The geometry accelerator performs transformations, decomposition of quadrilaterals, partial slope calculations for triangles and vectors, lighting (or shading), clipping, and plane equation (or slope) calculations of randomly oriented and defined quadrilaterals (quads), triangles and vectors. The outputs are supplied to the scan converters in the frame buffer board 14 for rendering into pixel data and to texture mapping board 12 for generation of per pixel texture color values.

In the example of FIG. 3, only the right stack 130 contains a divider, in order to limit size and cost. Because the right stack contains a divider and the left stack does not, the partitioning of functionality of the geometry accelerator is for the left stack to perform transformations, partial slope calculations, clip checking, decomposition and some pre-calculations for lighting. The right stack performs lighting, clipping and plane equation calculations. The basic flow of operations is for primitive data to be entered in the input FIFO 100 from the host computer. The primitive data is put into one of the vertex RAM buffers 102 and 104. The left stack 110 then performs transformations, decomposition, and partial slope calculations and places the results in one of the primitive RAM buffers 132 and 134. When the left stack has completed its operations for a primitive, it notifies the right stack 130 to begin operations on the primitive. The left stack can then start working on the next primitive. At the same time, the right stack performs lighting, clipping (if required), and plane equation calculations on the primitive that is in the primitive RAM buffer.

In an alternative embodiment, both the left and right stacks contain identical hardware, including dividers. In this configuration, functionality may be partitioned such that each stack performs the same operations on different primitives.

Figure 4:
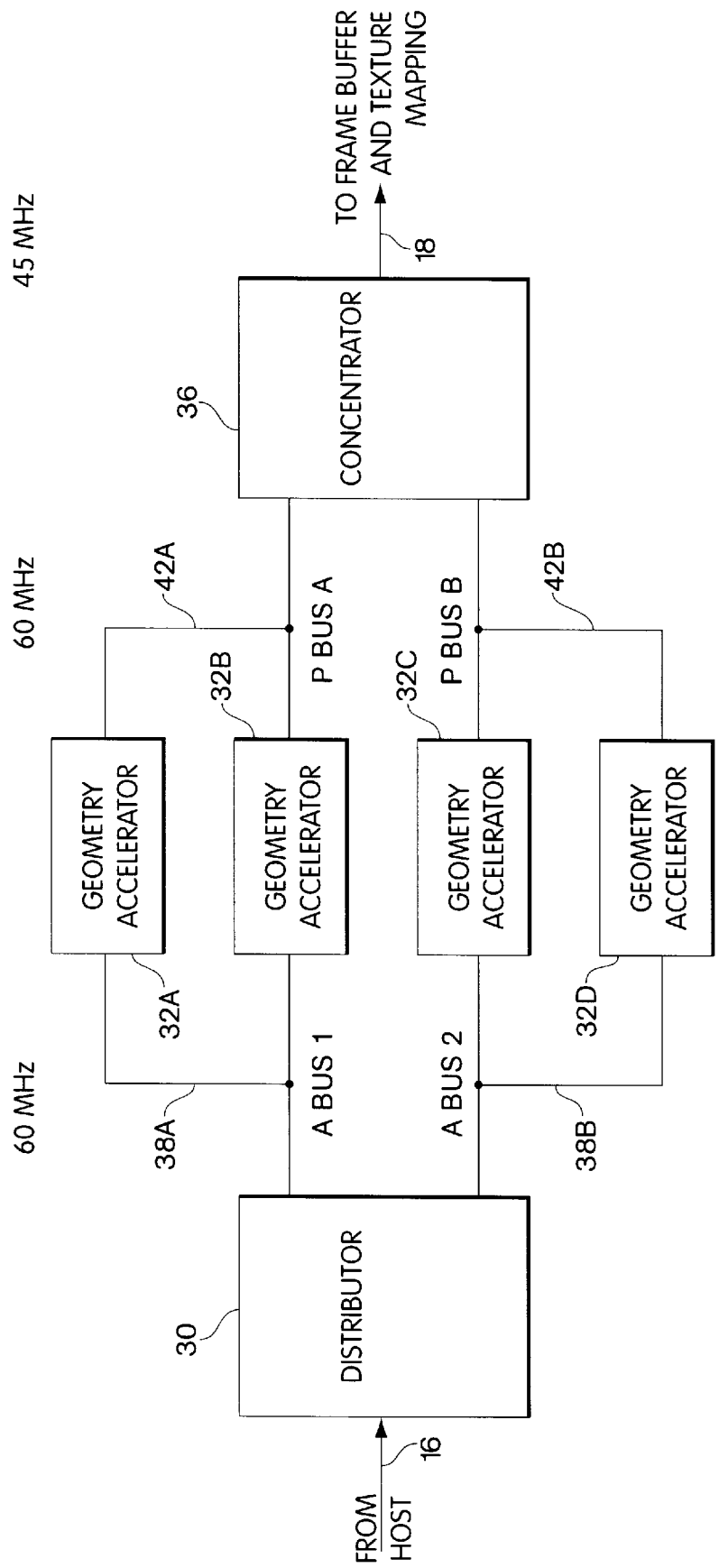
FIG. 4 is a block diagram of the front end of the computer graphics system which performs parallel processing of vertex data.

A simplified block diagram of the front end of the computer graphics systems of FIGS. 1 and 2 is shown in FIG. 4. Distributor 30 receives a stream of vertex data representative of graphics primitives from the host computer. Distributor 30 distributes chunks of vertex daaccel-eratorsry accelerators 32A and 32B on A bus 38A and distributes chunks of vertex data to geometry accelerators 32C and 32D on A bus 38B. The output of each geometry accelerator is rendering data corresponding to the primitives represented by the chunks of vertex data supplied to that geometry accelerator. Geometry accelerators 32A and 32B output rendering data to concentrator 36 on P bus 42A, and geometry accelerators 32C and 32D output rendering data to concentrator 36 on P bus 42B. The concentrator 36 combines the chunks of rendering data into a stream of rendering data that is supplied on bus 18 to frame buffer board 14 and texture mapping board 12 (FIG. 1).

The geometry accelerators 32A–32D process chunks of vertex data in parallel for high speed operation. As indicated above in connection with FIGS. 1 and 2, preferred configurations of the computer graphics system include either three or four geometry accelerators. When three geometry accelerators are utilized, geometry accelerator 32D is omitted from the system shown in FIG. 4. It will be understood that the system may include two geometry accelerators or more than four geometry accelerators, within the scope of the present invention. The number of geometry accelerators is dictated by the required performance.

In the configuration of FIG. 4, A buses 38A and 38B may each supply chunks of vertex data to two geometry accelerators (when the system includes four geometry accelerators) at 60 MHz, and P buses 42A and 42B may each supply chunks of rendering data from two geometry accelerators to concentrator 36 at 60 MHz. The output of concentrator 36 on bus 18 is at a rate of 45 MHz, because bus 18 has a double wide configuration, in which two rendering data words are supplied in each clock cycle. It will be understood that different bus configurations may be utilized within the scope of the present invention, depending on the relative operating speeds of the geometry accelerators and the input and output buses. The principal requirements are that the buses 38A and 38B be able to supply vertex data to each of the geometry accelerators at sufficient speed to keep them busy and that the buses 42A and 42B have sufficient capacity and operating speed to carry the rendering data to the concentrator 36 without delays. Thus, for example, the system may employ a single high speed input bus and a single high speed output bus for all of the geometry accelerators. Conversely, separate input and output buses operating at lower speed may be used for each of the geometry accelerators.

Figure 5:
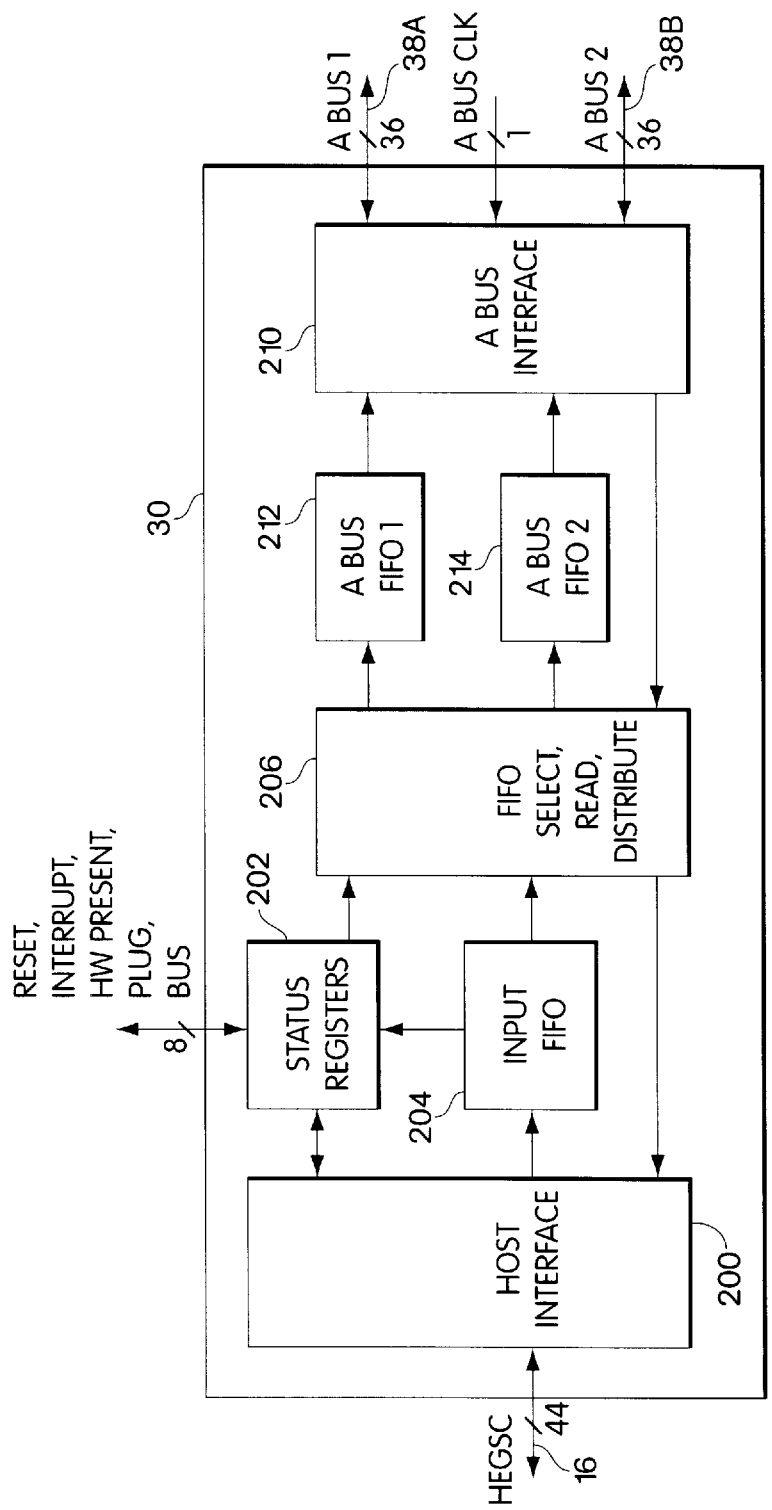
FIG. 5 is a block diagram of the distributor shown in FIG. 4.

A block diagram of an example of the distributor 30 is shown in FIG. 5. A host interface 200 decodes read/write transactions on the host bus 16 and sends the transactions to the appropriate block in the distributor. The host interface 200 uses the standard GSC protocol for receiving data from the host computer. Status registers 202 contain graphics system information, distributor FIFO information, signature registers and timeout control. An input FIFO buffer 204 is preferably a 128 word deep FIFO buffer that buffers all data supplied to the graphics system. Writes are synchronous to the host clock, while reads are synchronous to the clock that controls buses 38A and 38B. A FIFO select block 206 unloads the input FIFO buffer 204 and determines which A bus FIFO buffer should receive the data. The FIFO select block switches FIFO buffers based on decoding addresses in the host data which indicate the beginning of a chunk of vertex data. An A bus interface 210 interfaces with buses 38A and 38B. The distributor 30 includes two A bus ports. Each A bus port is capable of supplying chunks of vertex data to one or two geometry accelerators. The address and data lines are shared between geometry accelerators on each A bus port, while control lines are not shared. FIFO buffer 212 and FIFO buffer 214 are each connected between FIFO select block 206 and A bus interface 210. Each A bus port has a dedicated FIFO buffer. Writes to and reads from FIFO buffers 212 and 214 are synchronous to the A bus clock.

The status registers 202 contain control bits and keep track of error conditions. Included in the status registers 202 is a configuration status register which contains information about the configuration of the geometry accelerators. In particular, a four bit field in the configuration status register indicates which geometry accelerators are installed in the graphics system. The input FIFO buffer 204 receives write data from the host interface 200 at the host clock rate, and the FIFO select block 206 reads data from the output at the A bus clock rate. The input FIFO buffer 204 also keeps track of the FIFO free count. Input FIFO 204 preferably uses 45 bit words: 32 data bits and 13 address bits. The status registers 202 contain information about the input FIFO buffer 204, including FIFO free count, FIFO full and FIFO empty.

Each of the A buses 38A and 38B includes 12 bits of address, 16 bits of data, 5 bits of control and an A bus clock. In a preferred embodiment, data, address and end of chunk bits are common to geometry accelerators 32A and 32B on A bus 38A, and the control bits are unique to each of geometry accelerators 32A and 32B. Similarly on A bus 38B, data, address and end of chunk bits are common to geometry accelerators 32C and 32D, and the control bits are unique to each of geometry accelerators 32C and 32D. Among the control signals is an A bus address valid (AnVALN) bit, which is asserted when the distributor places a valid address on the bus. The distributor has four separate A bus address valid pins for up to four geometry accelerators. An A bus end of chunk (AnEOC) bit indicates to the geometry accelerator that the current data is the last piece of data in the chunk. Reads and writes of the FIFO buffers 212 and 214 are synchronous to the A bus clock. The FIFO buffers each use 45 bit words: 32 bits of data, 12 bits of address and 1 bit for end of chunk. The FIFO buffers are preferably 64 words deep. A geometry accelerator select circuit in the A bus interface 210 generates A bus address valid signals for the appropriate geometry accelerator. The geometry accelerator select circuit uses a round robin select of geometry accelerators for writes in a predetermined order as described below. The round robin scheme works as follows. The distributor writes data from the FIFO buffer to the same geometry accelerator until the end of chunk bit is decoded. Then the distributor begins writing to the next geometry accelerator. The end of chunk bit indicates that the current data is the last data in the chunk.

The FIFO select block 206 decodes the address portion of the data from the input FIFO buffer 204 to determine if the data is global (goes to all geometry accelerators), or if the current word is the end of chunk. The FIFO select block 206 also tests the configuration status register in status registers 202 to determine which geometry accelerators are available. If only three geometry accelerators are available, FIFO select block 206 writes two chunks to one of the FIFO buffers 212 and 214 and then one chunk to the other FIFO buffer. If geometry accelerators connected to only one of the A buses are enabled, FIFO select block 206 writes to only one of the FIFO buffers 212 and 214. When four geometry accelerators are enabled, the FIFO select block 206 alternates writing chunks between FIFO buffers 212 and 214.

The end of chunk bit is generated by the distributor 30 by decoding beginning of chunk from the address bits. Decoding of the beginning of chunk is possible because the host computer writes to specified registers, designated as V0.X or VM.X, in the geometry accelerator whenever it starts a new chunk. The end of chunk bit is generated in the FIFO select block 206 as follows. The beginning of chunk is decoded from the address bits which represent register V0.X or VM.X. Next, the FIFO select block 206 sets the end of chunk bit true on the previous word and sends it to the appropriate FIFO buffer 212 or 214. If the FIFO select block 206 does not receive the last word in a chunk and a write to the V0.X or VM.X register on successive cycles, then the FIFO select block 206 sends a no operation code (NOP) with the end of chunk bit true to the appropriate FIFO buffer 212 or 214.

A chunk is defined as vertex data representative of a specified number of triangles or vectors. The host computer sends this number of triangles or vectors through the graphics system as a continuous triangle strip or polyline. It is necessary that the primitive order be maintained as primitives flow through the graphics system. The reason for this is that the triangles in triangle strips share two of their three vertices. Therefore, one continuous triangle strip must be passed through the same geometry accelerator. The distributor sends a chunk of triangles or vectors to each geometry accelerator consecutively in a predefined sequence. As the last data word of each chunk of data is output from the distributor, the corresponding end of chunk bit is set true. The end of chunk bit passes through the geometry accelerator to the concentrator 36.

The distributor 30 and the concentrator 36 must follow the same geometry accelerator sequence. The sequence is a function of how many geometry accelerators are present in the system and which buses they are connected to. This is determined by the configuration register in the status registers 202. As discussed below, the concentrator 36 includes a corresponding configuration register so that the distributor 30 and the concentrator 36 follow the same sequence. In a preferred embodiment, the chunk sequence is as follows. For a configuration having three geometry accelerators as shown in FIG. 1, the preferred sequence is: 32A, 32B, 32C, repeat. For a configuration having four geometry accelerators as shown in FIG. 2, the preferred sequence is: 32A, 32C, 32B, 32D, repeat. The sequence for the configuration with four geometry accelerators ensures that two consecutive chunks will not appear on the same P bus, thereby optimizing bus utilization.

As indicated above, the end of chunk bit may be associated with the last data word of a primitive or may be placed with a no op code after the primitive. In general, the end of chunk bit is simply passed through the geometry accelerator to the concentrator 36 to determine when to fetch data from a different geometry accelerator. When the end of chunk bit is associated with a pass-through command, the geometry accelerator treats the end of chunk bit as just another address bit and passes the address, data and end of chunk bit through the geometry accelerator pipeline in the order in which it was received. Thus, the end of chunk bit is output from the geometry accelerator. When the end of chunk bit is associated with a primitive, the end of chunk bit is asserted when the address is supplied for the write to the trigger register. In this case, the primitive is tagged as an end of chunk, and the final word of the primitive that is output from the geometry accelerator has the end of chunk bit attached. This process is slightly complicated by the fact that primitives may be clipped or may be trivially rejected. If the primitive is not clipped, the end of chunk bit follows it through the geometry accelerator and the end of chunk bit is asserted on the output bus with the address of the last data word. For clipped primitives which are not trivially rejected, the geometry accelerator ensures that the last word output for the clipped primitive has an end of chunk bit associated with it. For the clip rejected case, the geometry accelerator outputs a no op code with an end of chunk bit. This is the case for vectors, triangles and quads. Trivially rejected primitives are a special case. To increase performance, most of the geometry accelerator pipeline is not executed when a trivial reject has been detected. If the primitive does not have an end of chunk bit attached, the primitive is dropped. However, when the primitive has an end of chunk bit attached, the geometry accelerator adds an end of chunk signal and a no op code to the data stream where the primitive data would have been if the primitive not been trivially rejected.

Figure 6:
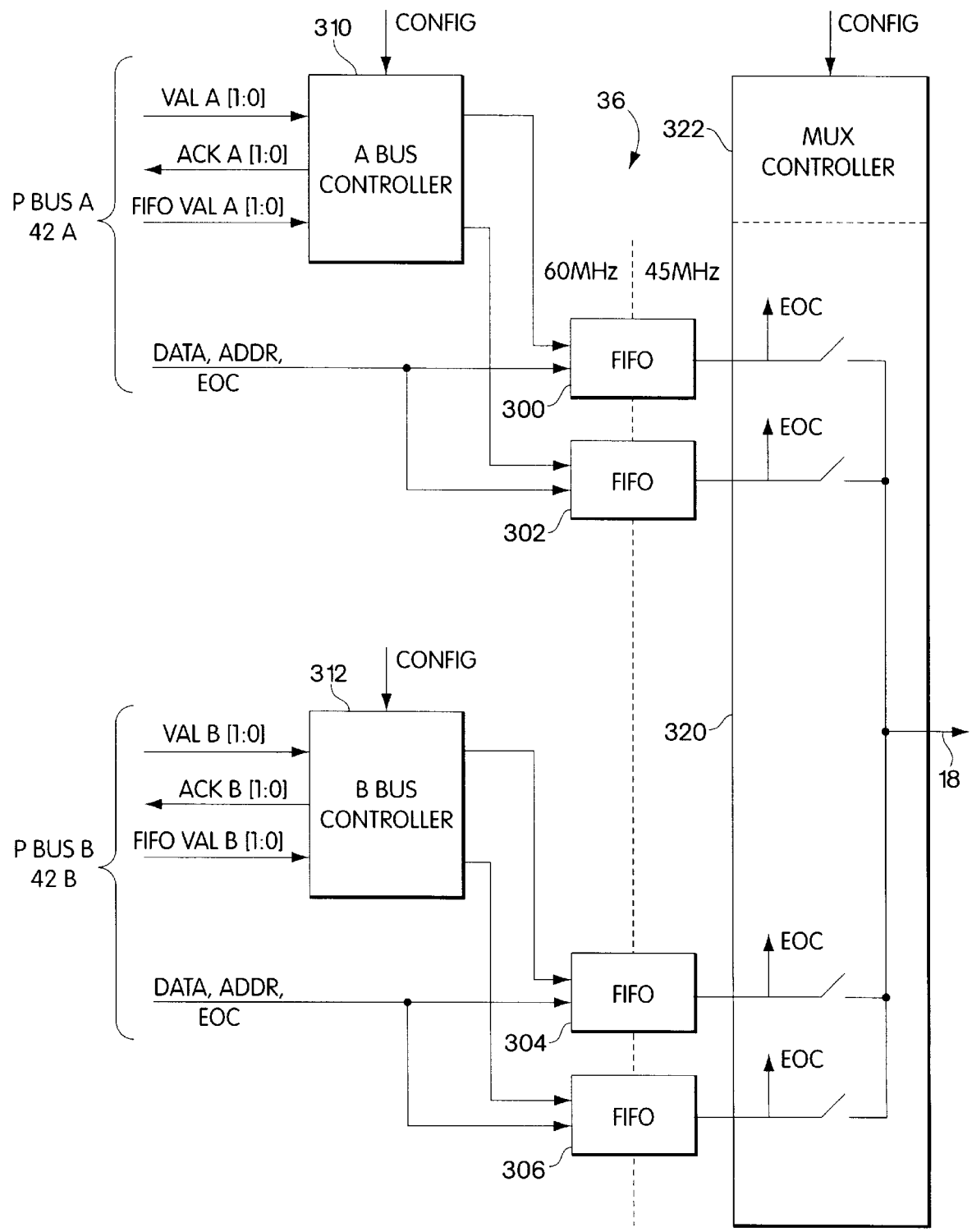
FIG. 6 is a block diagram of the concentrator shown in FIG. 4.

A block diagram of the concentrator 36 is shown in FIG. 6. The concentrator 36 includes input FIFO buffers 300, 302, 304 and 306, which correspond to geometry accelerators 32A, 32B, 32C and 32D, respectively. The data, address and end of chunk bits of P bus 42A are input to FIFO buffers 300 and 302. The address, data and end of chunk bits of P bus 42B are input to FIFO buffers 304 and 306. A bus controller 310 controls transfer of chunks of rendering data on P bus 42A from geometry accelerators 32A and 32B to FIFO buffers 300 and 302, respectively. A bus controller 312 controls transfer of chunks of rendering data on P bus 42B from geometry accelerators 32C and 32D to FIFO buffers 304 and 306, respectively. The bus controllers 310 and 312 receive control signals on the respective P buses 42A and 42B. Address valid bits (VAL A and VAL B) are provided for each geometry accelerator. The address valid bits indicate a valid address on the P bus. FIFO valid bits (FIFO VAL A and FIFO VAL B) are also provided for each geometry accelerator. The FIFO valid bits indicate that data is present in the output FIFO of the corresponding geometry accelerator. Acknowledge bits (ACK A and ACK B) are supplied from the concentrator 36 to the respective geometry accelerators. The acknowledge bit indicates to the geometry accelerator that the concentrator is ready to accept data from the geometry accelerator. The bus controllers 310 and 312 also receive configuration information which may be stored in configuration registers. The configuration information indicates the number of geometry accelerators present in the system and the sequence order for transfer of data into and out of the geometry accelerators.

In a preferred embodiment, the FIFO buffers 300, 302, 304 and 306 each have a double wide configuration. This means that two data words and two addresses can be stored in each FIFO buffer location. Since the P buses 42A and 42B each have a single wide configuration, two P bus clock cycles are required to load each FIFO buffer location. At the outputs of the FIFO buffers, data is transferred in the double wide format. For proper synchronization, the input clock rate is preferably 60 MHz and the output clock rate is preferably 45 MHz.

The outputs of the FIFO buffers 300, 302, 304 and 306 are supplied to first, second, third and fourth inputs, respectively, of a multiplexer 320. Each input to the multiplexer 320 is a double wide bus as described above. The multiplexer 320 selects one of the FIFO buffer outputs at a time for connection to output bus 18. In particular, multiplexer 320 combines the chunks of rendering data from the geometry accelerators 32A–32D into a single stream of rendering data on output bus 18. The stream of rendering data represents a sequence of primitives having the same order as the sequence of primitives received from the host computer. The end of chunk bit is used in combination with configuration information to combine the chunks of rendering data.

The multiplexer 320 includes a multiplexer controller 322 which controls selection of output data from the FIFO buffers 300, 302, 304 and 306. The multiplexer controller 322 contains a configuration register which defines the geometry accelerators that are present in the system and the sequence in which data is distributed to the geometry accelerators by the distributor 30 and is combined by the concentrator 36. The multiplexer controller 322 also receives each end of chunk bit that is output by the FIFO buffers as discussed above. The end of chunk bit indicates that the current data word is the last word of a chunk. When the multiplexer controller 322 receives an end of chunk bit, the current FIFO buffer output connected to output bus 18 is disabled and the next FIFO buffer output in the sequence is supplied to output bus 18. The process is repeated, with the multiplexer 320 selecting a different FIFO output each time an end of chunk signal is received.

As discussed above, it is necessary that primitive order be maintained as data flows through the graphics system. The distributor 30 sends chunks of vertex data to each geometry accelerator consecutively in a predefined sequence. As the last data word of each chunk of rendering data is output by the geometry accelerator, the corresponding end of chunk bit is asserted. The end of chunk bit is used by the multiplexer 320 to determine when to start reading data from a different FIFO buffer. The concentrator 36 and the distributor 30 must follow the same sequence of geometry accelerator chunk ordering. The sequence is a function of the number of geometry accelerators in the system and where they are connected. Thus, it is important that the configuration register in the distributor 30 and the configuration register in the concentrator 36 define the same configuration.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A computer graphics system comprising:
   a plurality of geometry accelerators for processing vertex data representative of graphics primitives and providing rendering data, each of said plurality of geometry accelerators having an input and an output;
   a distributor responsive to a stream of vertex data for distributing to said plurality of geometry accelerators chunks of said vertex data for processing by said plurality of geometry accelerators to provide chunks of rendering data, said distributor including means for generating, for each of said chunks of vertex data, an end of chunk bit indicative of the end of a corresponding chunk of vertex data and means for distributing each of said end of chunk bits to one of said geometry accelerators with said corresponding chunk of vertex data, each of said geometry accelerators including means for transmitting each of said end of chunk bits from said input to said output;
   a concentrator for receiving said chunks of rendering data and said end of chunk bits from each of said geometry accelerators and responsive to said end of chunk bits for combining said chunks of rendering data from each of said geometry accelerators into a stream of rendering data, wherein said stream of rendering data and said stream of vertex data represent sequences of graphics primitives having the same order; and
   a rasterizer responsive to said stream of rendering data for generating pixel data representative of a graphics display.

2. A computer graphics system as defined in claim 1 wherein said concentrator comprises a plurality of first-in first-out (FIFO) buffers respectively connected to outputs of said geometry accelerators, a multiplexer having inputs respectively coupled to the outputs of said FIFO buffers and an output for providing said stream of rendering data, and a multiplexer controller responsive to said end of chunk bits for sequentially selecting outputs of said FIFO buffers in accordance with a defined sequence.

3. A computer graphics system as defined in claim 1 wherein said distributor includes a configuration register for defining a number of geometry accelerators in the system and for defining a sequence for distributing said chunks of vertex data to said plurality of geometry accelerators, said sequence depending on the number of geometry accelerators in the system, and means for distributing said chunks of vertex data to said plurality of geometry accelerators in said defined sequence.

4. A computer graphics system as defined in claim 3 wherein said concentrator includes means combining said chunks of rendering data from said plurality of geometry accelerators in said defined sequence.

5. A computer graphics system as defined in claim 1 wherein each of said geometry accelerators includes means for maintaining said end of chunk bit in said vertex data even if a portion of said vertex data is clipped during processing.

6. A computer graphics system as defined in claim 1 including at least three geometry accelerators.

7. A computer graphics system as defined in claim 1 including first, second and third geometry accelerators, wherein said chunks of vertex data are coupled from said distributor to said first and second geometry accelerators on a first distributor bus, said chunks of vertex data are coupled from said distributor to said third geometry accelerator on a second distributor bus, said chunks of rendering data are coupled from said first and second geometry accelerators to said concentrator on a first concentrator bus, and said chunks of rendering data are coupled from said third geometry accelerator to said concentrator on a second concentrator bus.

8. A computer graphics system as defined in claim 1 including first, second, third and fourth geometry accelerators, wherein said chunks of vertex data are coupled from said distributor to said first and second geometry accelerators on a first distributor bus, said chunks of vertex data are coupled from said distributor to said third and fourth geometry accelerators on a second distributor bus, said chunks of rendering data are coupled from said first and second geometry accelerators to said concentrator on a first concentrator bus and said chunks of rendering data are coupled from said third and fourth geometry accelerators to said concentrator on a second concentrator bus.

9. A computer graphics system as defined in claim 1 wherein said vertex data is coupled to said geometry accelerators on first and second distributor buses and wherein said distributor includes a first FIFO buffer for supplying said chunks of vertex data on said first distributor bus, a second FIFO buffer for supplying said chunks of vertex data on said second distributor bus and a distributor for distributing said chunks of vertex data between said first and second FIFO buffers.

10. A computer graphics system as defined in claim 1 wherein each of said end of chunk bits is associated with a last word of each of said chunks of vertex data.

11. A method for processing vertex data in a computer graphics system, comprising the steps of:

distributing chunks of vertex data representative of graphics primitives to a plurality of geometry accelerators, each having an input and an output;

generating, for each of said chunks of vertex data, an end of chunk bit indicative of the end of a corresponding chunk of vertex data;

distributing each of said end of chunk bits to one of said geometry accelerators with said corresponding chunk of vertex data;

said plurality of geometry accelerators processing said chunks of vertex data to provide chunks of rendering data;

said plurality of geometry accelerators transmitting each of said end of chunk bits from said input to said output;

combining said chunks of rendering data in response to said end of chunk bits to provide a stream of rendering data, wherein said stream of rendering data and said stream of vertex data represent sequences of graphics primitives having the same order; and rasterizing said stream of rendering data to provide pixel data representative of a graphics display.

12. A method for processing vertex data as defined in claim 11 further including the step of defining a sequence for distributing said chunks of vertex data to said plurality of geometry accelerators and wherein said chunks of vertex data are distributed to said plurality of geometry accelerators in said defined sequence.

13. A method for processing vertex data as defined in claim 12 wherein said chunks of rendering data are combined in said defined sequence.

14. A method for processing vertex data as defined in claim 11 further including the step of maintaining said end of chunk bits in said vertex data even if a portion of said vertex data is clipped during processing.

* * * * *